United States Patent [19]

Ueno et al.

[11] 4,420,594

[45] * Dec. 13, 1983

[54] METHOD FOR POLYMERIZING ETHYLENE

[75] Inventors: Haruo Ueno, Chiba; Takefumi Yano, Ichihara; Michimasa Shimizu, Ichihara; Masanori Tamura, Ichihara; Sakae Yuasa, Ichihara, all of Japan

[73] Assignee: UBE Industries, Ltd., Yamaguchi, Japan

[*] Notice: The portion of the term of this patent subsequent to Dec. 15, 1998 has been disclaimed.

[21] Appl. No.: 349,872

[22] Filed: Feb. 18, 1982

[30] Foreign Application Priority Data

Feb. 26, 1981 [JP] Japan .................................. 56-26102

[51] Int. Cl.³ .......................... C08F 4/02; C08F 10/02
[52] U.S. Cl. .................................... 526/128; 526/125; 526/127; 526/348.6; 526/352; 502/158; 502/169
[58] Field of Search ....................... 526/127, 128, 125; 252/429 B

[56] References Cited

U.S. PATENT DOCUMENTS 4,297,463 10/1981 Ueno et al. ........................... 526/128
4,306,046 12/1981 Ueno et al. ........................... 526/128

FOREIGN PATENT DOCUMENTS 2040967 9/1980 United Kingdom ................ 526/125

*Primary Examiner*—Edward J. Smith
*Attorney, Agent, or Firm*—Burgess, Ryan & Wayne

[57] ABSTRACT

An ethylene polymer is produced with an excellent yield by bringing a feed containing ethylene into contact with a catalyst which comprises (A) a solid catalytic ingredient prepared (a) by reacting a Grignard compound with a reaction product of an aluminum halide with an organic silicon compound of the formula, $R^1_n Si(OR^2)_{4-n}$, wherein $R^1 = C_{1-8}$ alkyl or phenyl, $R^2 = C_{1-8}$ alkyl and $n = 1$, 2 or 3 and (b) by bringing the resultant solid reaction product into contact with titanium tetrahalide and (B) another catalytic ingredient consisting of at least one trialkyl aluminum.

32 Claims, No Drawings

METHOD FOR POLYMERIZING ETHYLENE

FIELD OF THE INVENTION

The present invention relates to a method for polymerizing ethylene. More particularly, the present invention relates to a method for polymerizing a feed containing ethylene in the presence of a new type of catalyst.

BACKGROUND OF THE INVENTION

It is known that a polymerization of ethylene can be effected by using a highly active catalyst composed of a solid catalytic ingredient in which a titanium tetrahalide is carried on a magnesium compound and another ingredient which consists of an organic aluminum compound. With respect to the above-mentioned polymerization, various approaches have been attempted to provide a new method which is effective for increasing the yield of the resultant polymer per unit weight of the solid catalytic ingredient in the catalyst used, to such an extent that the resultant polymer contains a very small amount of the used catalyst therein. As a result, the step of removing the used catalyst from the resultant polymer can be omitted.

For example, Japanese Patent Application Laid-Open No. 53-78287 (1978) discloses that ethylene can be polymerized by using a catalyst composed of a solid catalytic component which has been prepared by reacting a magnesium alcoholate with a reaction product of an aluminum halide with a tetraalkoxysilane, and by bringing the resultant solid product into contact with titanium tetrahalide, and another catalytic component consisting of an organic aluminum compound. Also, the above-mentioned laid-open application discloses that the pressure of ethylene in the polymerization procedure is adjusted to 10 kg/cm², resulting in a yield of polyethylene of about 25,000 g per gram of the solid catalytic component per hour of polymerization time. However, in order to produce a polyethylene having a high degree of purity thereof so that the operation of removing the used catalyst from the resultant polymer is unnecessary, it is necessary to increase the yield of the polymer per gram of the used catalyst to more than the above-mentioned yield.

In another approach which was made by the inventors of the present invention, a method for polymerizing ethylene in the presence of an improved catalyst was attempted. The catalyst was prepared by reacting a Grignard compound with a reaction product of a tetraalkoxysilane with a aluminum halide, by bringing the resultant solid reaction product into contact with a titanium tetrahalide, and by mixing the resultant solid catalytic ingredient with another catalytic ingredient consisting of a trialkylaluminum. When ethylene was polymerized in the presence of the above-mentioned catalyst under a pressure of ethylene of 10 kg/cm²G, the yield of polyethylene was from about 43,000 g to about 62,000 g per gram of the solid catalytic ingredient per hour of polymerization time.

It is known that in the polymerization of ethylene in the presence of a catalyst in which a magnesium compound is carried, the yield of the polyethylene per gram of the solid catalytic ingredient in the catalyst and per hour of polymerization time is proportional to the pressure of ethylene in the polymerization system. That is, the larger the pressure of ethylene, the larger the yield of the resultant polyethylene. However, high pressure polymerization is dangerous and, therefore, has to be carried out in a special pressure-resistant polymerization apparatus.

Accordingly, it is desirable to provide a new type of catalyst which is effective for polymerizing ethylene under a relatively low pressure of ethylene and for obtaining a satisfactory yield of the resultant polyethylene.

SUMMARY OF THE INVENTION

An object of the present invention is to provide a method for catalytically polymerizing ethylene under a relatively low pressure of ethylene to produce a polyethylene in an excellent yield per gram of the solid catalytic ingredient.

Another object of the present invention is to provide a method for polymerizing ethylene by using such a very small amount of catalyst that it is not necessary to remove the used catalyst from the resultant polymer.

Another object of the present invention is to provide a method for polymerizing ethylene to produce a polyethylene having a large bulk density.

The above-mentioned objects can be attained by the method of the present invention which comprises bringing a feed containing ethylene into contact with a catalyst comprising (A) a solid catalytic ingredient which has been prepared in such a manner that (a) a reaction product of an aluminum halide with an organic silicon compound of the formula (I):

$$R^1{}_n Si(OR^2)_{4-n} \qquad (I)$$

wherein $R^1$ represents a member selected from the group consisting of alkyl radicals having 1 to 8 carbon atoms and a phenyl radical, $R^2$ represents an alkyl radical having 1 to 8 carbon atoms, and n represents an integer of from 1 to 3, is reacted with a Grignard compound of the formula (II):

$$R^3 MgX \qquad (II)$$

wherein $R^3$ represents an alkyl radical having 1 to 8 carbon atoms and X represents a halogen atom and (b) the resultant solid reaction product is brought into contact with a titanium tetrahalide and (B) another catalytic ingredient consisting of at least one trialkyl aluminum of the formula (III):

$$AlR^4{}_3 \qquad (III)$$

wherein $R^4$ represents an alkyl radical having 2 to 6 carbon atoms.

DETAILED DESCRIPTION OF THE INVENTION

In the method of the present invention, it is essential that the polymerization of ethylene is carried out in the presence of a specific catalyst. The specific catalyst is a solid catalytic ingredient prepared from a reaction product of an aluminum halide with an organic silicon compound of the formula (I):

$$R^1{}_n Si(OR^2)_{4-n} \qquad (I)$$

wherein $R^1$ represents a member selected from the group consisting of alkyl radicals having 1 to 8 carbon atoms and a phenyl radical, $R^2$ represents an alkyl radical having 1 to 8 carbon atoms, and n represents an integer of from 1 to 3; a Grignard compound of the formula (II):

$$R^3MgX \qquad (II)$$

wherein $R^3$ represents an alkyl radical having 1 to 8 carbon atoms and X represents a halogen atom; and a titanium tetrahalide.

The aluminum halide is usually selected from the group consisting of aluminum chloride, aluminum bromide, and aluminum iodide. The most useful aluminum halide is aluminum chloride.

The organic silicon compound of the formula (I) may be selected from methyltrimethoxysilane, methyltriethoxysilane, methyltri-n-butoxysilane, methyltriisopentoxysilane, methyltri-n-hexoxysilane, methyltriisooctoxysilane, ethyltriethoxysilane, ethyltriisopropoxysilane, ethyltriisopentoxysilane, n-butyltriethoxysilane, isobutyltriethoxysilane, isopentyltriethoxysilane, isopentyltri-n-butoxysilane, dimethyldiethoxysilane, dimethyl-n-butoxysilane, dimethyldiisopentoxysilane, diethyldiethoxysilane, diethyldiisopentoxysilane, di-n-butyldiethoxysilane, diisobutyldiisopentoxysilane, trimethylmethoxysilane, trimethylethoxysilane, trimethylisobutoxysilane, triethylisopropoxysilane, tri-n-propylethoxysilane, tri-n-butylethoxysilane, triisopentylethoxysilane, phenyltriethoxysilane, phenyltriisobutoxysilane, phenyltriisopentoxysilane, diphenyldiethoxysilane, diphenyldiisopentoxysilane, diphenyldioctoxysilane, triphenylmethoxysilane, triphenylethoxysilane, and triphenylisopentoxysilane.

In the preparation of the reaction product of the aluminum halide and the organic silicon compound, it is preferable that the aluminum halide is used in an amount of from 0.25 to 10 moles, more preferably, 0.5 to 2 moles, per mole of the organic silicon compound. The reaction of the aluminum chloride with the organic silicon compound is usually carried out by stirring a mixture of the aluminum chloride and the organic silicon compound in an inert organic solvent, at a temperature of from $-50°$ C. to 100° C. for 0.1 to 2 hours. The inert organic solvent comprises at least one compound selected from the group consisting of aliphatic and aromatic hydrocarbons, for instance, hexane, heptane, benzene, and toluene, and halogenated aliphatic and aromatic hydrocarbons, for example, chlorobenzenes, dichlorohexanes, and dichloroheptanes. This reaction is an exothermic reaction. The resultant reaction product is obtained in the form of a solution in the inert organic solvent. Usually, the reaction product is not isolated from the solution and the solution is used for the reaction with the Grignard compound.

The Grignard compound is selected from those of the formula (II), $R^3MgX$, in which $R^3$ represents an alkyl radical having 1 to 8 carbon atoms and X represents a halogen atom. In the above-mentioned formula, it is preferable that X represents a chlorine atom. That is, the Grignard compound is preferably selected from methylmagnesium chloride, ethylmagnesium chloride, n-butylmagnesium chloride, and n-hexylmagnesium chloride.

Also, it is preferable that the Grignard compound is used in an amount of from 0.05 to 4 moles, more preferably, from 1.5 to 2 moles, per mole of the organic silicon compound which has been reacted with the aluminum halide.

The reaction of the Grignard compound with the aluminum halide-organic silicon compound reaction product in step (a) can be carried out by any of the conventional reaction methods. For example, the reaction of step (a) is carried out by mixing a solution of the aluminum halide-organic silicon compound reaction product in the inert solvent with a solution of the Grignard compound in a solvent consisting of at least one member selected from the group consisting of aliphatic ether compounds and mixtures of the aliphatic ether compounds with aromatic hydrocarbons, for example, benzene, toluene and xylene. In the mixing procedure, the solution of the Grignard compound may be gradually added to a solution of the aluminum halide-organic silicon compound reaction product in the inert organic solvent. Otherwise, the solution of the aluminum halide-organic silicon compound reaction product may be gradually added to the solution of the Grignard compound.

The above-mentioned ether compound is preferably selected from those of the formula $R^5$—O—$R^6$, wherein $R^5$ and $R^6$ both represent an alkyl radical having 2 to 8 carbon atoms. The preferred ethers are diethyl ether, di-isopropyl ether, di-n-butyl ether, and di-isoamyl ether.

The reaction of the Grignard compound with the aluminum halide-organic silicon compound reaction product in step (a) is usually carried out at a temperature of from $-50°$ C. to 100° C., preferably, from $-20°$ C. to 25° C., for a period of time sufficient for completing the reaction, usually, about 5 minutes or more. The reaction in step (a) results in precipitation of a solid white reaction product from the reaction mixture.

The resultant solid reaction product in step (a) is separated from the reaction mixture. The separated solid reaction product can be directly subjected to step (b). However, it is preferable that the separated solid reaction product is washed with an organic solvent, for example, benzene, toluene, hexane, and heptane.

In step (b), the solid reaction product is brought into contact with a titanium tetrahalide, so as to allow at least a portion of the titanium used to be carried on the solid reaction product. The titanium tetrahalide to be used in step (b) is preferably selected from titanium tetrachloride, titanium tetrabromide, and titanium tetraiodide. The most preferable titanium tetrahalide is titanium tetrachloride. Also, in step (b), it is preferable that the titanium tetrahalide is used in an amount of one mole or more, more preferably, from 2 to 100 moles, per mole of the Grignard compound used in step (a). In step (b), the contact of the solid reaction product with the titanium tetrahalide is carried out in the presence or absence of an inert organic solvent, for example, benzene, toluene, hexane, and heptane, and halides of the above-mentioned compounds at a temperature of from 20° C. to 200° C., preferably, from 60° C. to 140° C., for a period of time sufficient for completing the contact, usually, from 0.5 to 3 hours.

After the contact is completed, the resultant solid catalytic ingredient is separated from the contacting mixture by means of filtration or decantation. The separated solid catalytic ingredient is washed with an inert organic solvent as described above. The separated solid catalytic ingredient preferably contains 1 to 10% by weight of titanium.

The resultant solid catalytic ingredient is used concurrently with another catalytic ingredient consisting of at least one trialkylaluminum of the formula (III). The preferred trialkylaluminums for the present invention are triethylaluminum, tri-isobutylaluminum, and tri-n- hexylaluminum. The most useful trialkylaluminums are triethylaluminum and tri-isobutylaluminum.

The trialkylaluminum is usually used in an amount of from 1 to 1,000 moles per gram atom of titanium contained in the solid catalytic ingredient.

The polymerization of the ethylene in accordance with the method of the present invention can be carried out either in a liquid phase or in a gaseous phase. In the case where the polymerization procedure is carried out in a liquid polymerization medium, the medium may be selected from aliphatic hydrocarbons, for example, n-butane, isobutane, n-propane, n-hexane, and n-heptane; cycloaliphatic hydrocarbons, for example, cyclohexane and cyclopentane; and aromatic hydrocarbons, for example, benzene and toluene.

In the process of the present invention, the catalyst can be suspended in any concentration in the polymerization medium. Usually, the concentration of the catalyst is in a range of from 0.0005 to 10 milligram atoms, in terms of elemental titanium contained in the catalyst, per liter of the polymerization medium, and in a range of from 0.001 to 1,000 millimoles, in terms of trialkylaluminum contained in the catalyst, per liter of the polymerization medium.

The method of the present invention is effective not only for polymerizing ethylene alone, but also, for co-polymerizing ethylene with at least one α-olefin having 3 or more carbon atoms, for example, propylene, 1-butane, 4-methyl-1-pentene, 1-hexane, and 1-octene.

In the method of the present invention, the polymerization operation can be carried out in the same manner as that for the polymerization operation of the ethylene using a Ziegler type catalyst. That is, the polymerization is carried out in the absence of water and molecular oxygen. The polymerization temperature is usually in a range of from 30° C. to 100° C. and the polymerization pressure is usually in a range of from 1 to 80 kg/cm$^2$, preferably, from 5 to 50 kg/cm$^2$.

The method of the present invention can produce an ethylene polymer with a remarkably high degree of yield per unit weight of the solid catalytic ingredient contained in the catalyst used. Therefore, it is not necessary to remove the residual catalyst from the resultant polymer.

Also, the catalyst exhibits an excellent sensitivity to hydrogen which is used as a molecular weight regulating agent. Therefore, when the catalyst of the present invention is used, it is easy to regulate the molecular weight of the resultant polymer by using a small amount of hydrogen.

The specific examples presented hereinafter will serve to more fully explain how the present invention is practiced. However, it will be understood that these examples are only illustrative and in no way limit the scope of the present invention.

In the examples, the term "polymerization activity" used refers to a yield in grams of a resultant polymer per gram of a solid catalytic ingredient contained in a catalyst, per hour of polymerization time.

Also, the term "M.I." used in the examples refers to a melt flow index of a polymer which has been measured at a temperature of 190° C. under a load of 2.16 kg/cm$^2$ in accordance with ASTM D1238.

The preparation of a solid catalytic ingredient in each example, was carried out in a dry nitrogen atmosphere.

EXAMPLE 1

1. Preparation of Solid Catalytic Ingredient

A reaction product of aluminum chloride with an organic silicon compound of the formula (I) was prepared in such a manner that 15 millimoles of anhydrous aluminum chloride were suspended in 30 ml of toluene, 10 ml of a solution of 15 millimoles of methyltriethoxysilane in toluene were added dropwise to the aluminum chloride suspension over 30 minutes while the resultant mixture was stirred, and, then, the mixture was stirred at a temperature of 30° C. for 30 minutes.

The resultant reaction mixture was cooled to a temperature of −6° C., and 18 ml of a solution of 27 millimoles of n-butylmagnesium chloride in di-isoamyl ether were added dropwise to the cooled reaction mixture over 30 minutes while stirring the mixture. After the dropwise addition was completed, the temperature of the mixture was elevated to 30° C. over 60 minutes and, then maintained at 30° C. for one hour so as to continue the reaction. The resultant solid product was precipitated from the reaction mixture. The solid product was filtered and washed with 30 ml of toluene five times.

The resultant reaction product was suspended in 30 ml of toluene, and 16.5 ml of titanium tetrachloride were added to the suspension. The mixture was stirred at a temperature of 90° C. for 60 minutes so as to allow the solid product to come into contact with titanium tetrachloride. The resultant titanium-containing solid product was filtered at 90° C., and washed five times each time with 30 ml of n-heptane.

The resultant titanium-containing solid catalytic ingredient was suspended in 30 ml of n-heptane. The solid catalytic ingredient contained 5.4% by weight of titanium.

2. Polymerization

The suspension containing 4.1 mg of the solid catalytic ingredient was placed in a glass ampoule and the ampoule was sealed. The ampoule was placed in a 2-liter autoclave with a stirrer, and, thereafter, the autoclave was closed and air in the autoclave was replaced by nitrogen gas.

The autoclave was charged with one liter of n-heptane and, then, with 1.6 ml of a solution of 1.1 millimoles of triethylaluminum in n-heptane Thereafter, the temperature of the content in the autoclave was elevated to 90° C. In this stage, the inner pressure of the autoclave was 0.9 kg/cm$^2$G.

The autoclave was charged with ethylene gas until the entire pressure in the autoclave reached 7.9 kg/cm$^2$G.

Thereafter, a stirring procedure was applied to the content in the autoclave so as to break the glass ampoule and to start the polymerization of ethylene. The polymerization procedure was continued at a temperature of 90° C. for 60 minutes. During the polymerization procedure, an additional amount of ethylene was continuously introduced into the autoclave so as to maintain the entire pressure of the content in the autoclave at 7.9 kg/cm$^2$G.

After the polymerization was completed, non-reacted ethylene was exhausted from the autoclave. The broken glass ampoule was removed from the polymerization mixture. The polymerization product was removed from the autoclave and dried at a temperature of 50° C. for 20 hours under a reduced pressure.

White polyethylene powder was obtained in an amount of 314 g. The polyethylene powder exhibited a bulk density of 0.36 and a density of 0.946 g/cm$^3$. The polymerization activity of the catalyst used was 76,600.

COMPARATIVE EXAMPLE

The same procedures as those described in Example 1 were carried out, except that 15 millimoles of tetraethoxysilane were used in place of methyltriethoxysilane and the solid catalytic ingredient contained 5.1% by weight of titanium.

The polymerization activity of the comparative catalyst was 40,100. The resultant polyethylene powder exhibited a bulk density of 0.36 and a density of 0.950 g/cm$^3$.

EXAMPLES 2 THROUGH 4

In each of the Examples 2 through 4, the same procedures as those mentioned in Example 1 were carried out, except that triethylaluminum was used in the amount indicated in Table 1. The results are indicated in Table 1.

TABLE 1

| Example No. | Amount of triethylaluminum (m mole) | Catalyst Polymerization activity | Polyethylene Bulk density |
|---|---|---|---|
| 2 | 0.92 | 74,300 | 0.36 |
| 3 | 0.46 | 75,200 | 0.36 |
| 4 | 0.23 | 68,000 | 0.36 |

EXAMPLES 5 THROUGH 7

In each of the Examples 5 through 7, the same procedures as those described in Example 1 were carried out except that before the ethylene gas was introduced, hydrogen gas was introduced into the autoclave until the pressure of the hydrogen gas in the autoclave reached the value indicated in Table 2. Then, the ethylene gas was introduced into the autoclave until the partial pressure of the ethylene gas in the autoclave reached 7 kg/cm$^2$ and except that during the polymerization procedure, an additional amount of ethylene was continuously introduced into the autoclave so as to maintain the entire pressure of the contents in the autoclave at the same level as that of the initial entire pressure.

The results are indicated in Table 2.

TABLE 2

| Example No. | Pressure of hydrogen gas (kg/cm$^2$) | Catalyst Polymerization activity | Polyethylene Bulk density | M.I. (g/10 min) |
|---|---|---|---|---|
| 5 | 1 | 70,800 | 0.37 | 0.5 |
| 6 | 3 | 69,300 | 0.36 | 2.2 |
| 7 | 5 | 67,200 | 0.36 | 2.7 |

EXAMPLES 8 THROUGH 10

In each of Examples 8 through 10, the same procedures as those described in Example 1 were carried out except that 15 millimoles of the organic silicon compound indicated in Table 3 were used in place of methyltriethoxysilane, and the solid catalytic ingredient contained the amount of titanium indicated in Table 3.

The results are indicated in Table 3.

TABLE 3

| Example No. | Type of organic Silicon compound | Percent of titanium solid catalytic ingredient (wt %) | Catalyst Polymerization activity | Polyethylene Bulk density |
|---|---|---|---|---|
| 8 | Dimethyldiethoxysilane | 5.3 | 75,300 | 0.36 |
| 9 | Phenyltriethoxysilane | 5.6 | 78,300 | 0.36 |
| 10 | Diphenyldiethoxysilane | 5.2 | 74,200 | 0.36 |

EXAMPLE 11

A reaction autoclave having a capacity of one liter and equipped with a stirrer was charged with a glass ampoule containing the same suspension of 2.10 mg of the solid catalytic ingredient as that described in Example 1, and, then, air in the autoclave was replaced by nitrogen gas.

Into the autoclave, 1.1 ml of a solution of 0.645 millimoles of triethylaluminum in n-heptane was introduced, and then, hydrogen gas was introduced until the pressure of the hydrogen gas in the autoclave reached 5 kg/cm$^2$. Thereafter, the autoclave was charged with 100 ml of liquid butene-1 and 500 ml of n-butane. The temperature of the contents in the autoclave was elevated to 66° C. In this stage, the inside pressure in the autoclave was 17.7 kg/cm$^2$.

Next, ethylene gas was introduced into the autoclave until the entire pressure in the autoclave reached 28 kg/cm$^2$, and then, the stirring operation was applied so as to break the glass ampoule and to start the polymerization of ethylene. The temperature of the contents in the autoclave was maintained at a level of 66° C. for 60 minutes and an additional amount of ethylene gas was continuously introduced into the autoclave so as to maintain the entire pressure in the autoclave at a level of 28 kg/cm$^2$ and to produce an ethylene-butene-1 copolymer.

After the polymerization procedure was completed, non-reacted monomers and n-butane were removed from the autoclave. A white ethylene-butene-1 copolymer powder was obtained in an amount of 107.1 g and exhibited a density of 0.931 g/cm$^3$, a M.I. of 2.0 g/10 min, and a bulk density of 0.26. The polymerization activity of the catalyst used was 51,000.

EXAMPLES 12 AND 13

In each of the Examples 12 and 13, the same procedures as those described in Example 11 were carried out, except that in Example 12, the partial pressure of the hydrogen gas was 1 kg/cm$^2$ and in Example 13, the amount of butene-1 charged into the autoclave was 200 ml, and in both Examples 12 and 13, the pressure of ethylene was 19.5 kg/cm$^2$.

The results are indicated in Table 4.

TABLE 4

| Example No. | Catalyst Polymerization activity | Ethylene-butene-1 copolymer Density (g/cm$^3$) | M.I. (g/10 min) |
|---|---|---|---|
| 12 | 63,200 | 0.927 | 0.1 |
| 13 | 67,500 | 0.913 | 0.1 |

We claim:

1. A method for polymerizing ethylene which comprises bringing a feed containing ethylene into contact with a catalyst comprising (A) a solid catalytic ingredient which has been prepared in such a manner that (a) a reaction product of an aluminum halide with an organic silicon compound of the formula (I):

$$R^1_n Si(OR^2)_{4-n} \quad (I)$$

wherein $R^1$ represents a member selected from the group consisting of alkyl radicals having 1 to 8 carbon atoms and a phenyl radical, $R^2$ represents an alkyl radical having 1 to 8 carbon atoms, and n represents an integer of from 1 to 3, is reacted with a Grignard compound of the formula (II):

$$R^3 MgX \quad (II)$$

wherein $R^3$ represents an alkyl radical having 1 to 8 carbon atoms and X represents a halogen atom and (b) the resultant solid reaction product is brought into contact with a titanium tetrahalide and (B) another catalytic ingredient consisting of at least one trialkyl aluminum of the formula (III):

$$AlR^4_3 \quad (III)$$

wherein $R^4$ represents an alkyl radical having 2 to 6 carbon atoms.

2. A method as claimed in claim 1, wherein said aluminum halide is selected from the group consisting of aluminum chloride, aluminum bromide and aluminum iodide.

3. A method as claimed in claim 1, wherein said aluminum halide is used in an amount of from 0.25 to 10 moles per mole of said organic silicon compound.

4. A method as claimed in claim 1, wherein the reaction of said aluminum halide with said organic silicon compound is carried out at a temperature of from $-50°$ C. to $100°$ C.

5. A method as claimed in claim 1, wherein in step (a), said Grignard compound is used in an amount of from 0.05 to 4 moles per mole of said organic silicon compound.

6. A method as claimed in claim 1, wherein the reaction of step (a) is carried out by mixing a solution of said aluminum halide-organic silicon compound reaction product in an inert organic solvent with a solution of said Grignard compound in a solvent consisting of at least one member selected from the group consisting of aliphatic ether compounds and mixtures of the aliphatic ether compounds with aromatic hydrocarbons.

7. A method as claimed in claim 1, wherein the reaction of step (a) is carried out at a temperature of from $-50°$ C. to $100°$ C.

8. A method as claimed in claim 1, wherein the solid reaction product in step (a) is washed with an inert organic solvent.

9. A method as claimed in claim 1, wherein said titanium tetrahalide to be used in step (b) is selected from titanium tetrachloride, titanium tetrabromide, and titanium tetraiodide.

10. A method as claimed in claim 1, wherein step (b), said titanium tetrahalide is used in an amount of at least one mole per mole of said Grignard compound used in step (a).

11. A method as claimed in claim 1, wherein the contact of said solid reaction product with said titanium tetrahalide in step (b) is carried out at a temperature of from 20° C. to 200° C.

12. A method as claimed in claim 1, wherein said solid catalytic ingredient (A) contains 1 to 10% by weight of titanium.

13. A method as claimed in claim 1, wherein said trialkyl aluminum is used in an amount of from 1 to 1000 moles per gram atom of titanium contained in said solid catalytic ingredient.

14. A method as claimed in claim 1, wherein the polymerization of ethylene is carried out in a liquid phase and said catalyst is suspended in a polymerization medium.

15. A method as claimed in claim 14, wherein said catalyst suspended in said polymerization medium is in an amount, in terms of elemental titanium, of 0.0005 to 10 milligram atoms per liter of said polymerization medium.

16. A method as claimed in claim 14, wherein said catalyst suspended in said polymerization medium is in an amount, in terms of the trialkyl aluminum, of 0.001 to 1,000 millimoles per liter of said polymerization medium.

17. A method as claimed in claim 1, wherein the contact of said feed with said catalyst is carried out at a temperature of from 30° C. to 100° C.

18. A method as claimed in claim 1, wherein the contact of said feed with said catalyst is effected under a pressure of from 1 to 80 kg/cm$^2$.

19. A method as claimed in claim 1, wherein said feed contains, in addition to ethylene, at least one α-olefin having 3 or more carbon atoms.

20. A method as claimed in claim 19, wherein said α-olefin is selected from the group consisting of propylene, 1-butene, 4-methyl-pentene, 1-hexene and 1-octene.

21. A solid catalytic ingredient for the polymerization of ethylene, which is one prepared in such a manner that (a) a reaction product of an aluminum halide with an organic silicon compound of the formula (I):

$$R^1_n Si(OR^2)_{4-n} \quad (I)$$

wherein $R^1$ represents a member selected from the group consisting of alkyl radicals having 1 to 8 carbon atoms and a phenyl radical, $R^2$ represents an alkyl radical having 1 to 8 carbon atoms, and n represents an integer of from 1 to 3, is reacted with a Grignard compound of the formula (II):

$$R^3 MgX \quad (II)$$

wherein $R^3$ represents an alkyl radical having 1 to 8 carbon atoms and X represents a halogen atom and (b) the resultant solid reaction product is brought into contact with a titanium tetrahalide.

22. A solid catalytic ingredient as claimed in claim 21, wherein said aluminum halide is selected from the group consisting of aluminum chloride, aluminum bromide and aluminum iodide.

23. A solid catalytic ingredient as claimed in claim 21, wherein said aluminum halide is used in an amount of from 0.25 to 10 moles per mole of said organic silicon compound.

24. A solid catalytic ingredient as claimed in claim 21, wherein the reaction of said aluminum halide with said organic silicon compound is carried out at a temperature of from $-50°$ C. to $100°$ C.

25. A solid catalytic ingredient as claimed in claim 21, wherein in step (a), said Grignard compound is used in an amount of from 0.05 to 4 moles per mole of said organic silicon compound.

26. A solid catalytic ingredient as claimed in claim 21, wherein the reaction of step (a) is carried out by mixing a solution of said aluminum halide-organic silicon compound reaction product in an inert organic solvent with a solution of said Grignard compound in a solvent consisting of at least one member selected from the group consisting of aliphatic ether compounds and mixtures of the aliphatic ether compounds with aromatic hydrocarbons.

27. A solid catalytic ingredient as claimed in claim 21, wherein the reaction of step (a) is carried out at a temperature of from $-50°$ C. to $100°$ C.

28. A solid catalytic ingredient as claimed in claim 21, wherein the solid reaction product in step (a) is washed with an inert organic solvent.

29. A solid catalytic ingredient as claimed in claim 21, wherein said titanium tetrahalide is selected from titanium tetrachloride, titanium tetrabromide, and titanium tetraiodide.

30. A solid catalytic ingredient as claimed in claim 21, wherein said titanium tetrahalide is used in an amount of at least one mole per mole of said Grignard compound used in step (a).

31. A solid catalytic ingredient as claimed in claim 21, wherein the contact of said solid reaction product with said titanium tetrahalide in step (d) is carried out at a temperature of from $20°$ C. to $200°$ C.

32. A solid catalytic ingredient as claimed in claim 21, wherein said solid catalytic ingredient (A) contains 1% to 10% by weight of titanium.

* * * * *